Feb. 7, 1956 — T. C. DELKER ET AL — 2,733,917
SHOCK STRUT
Filed Feb. 4, 1952
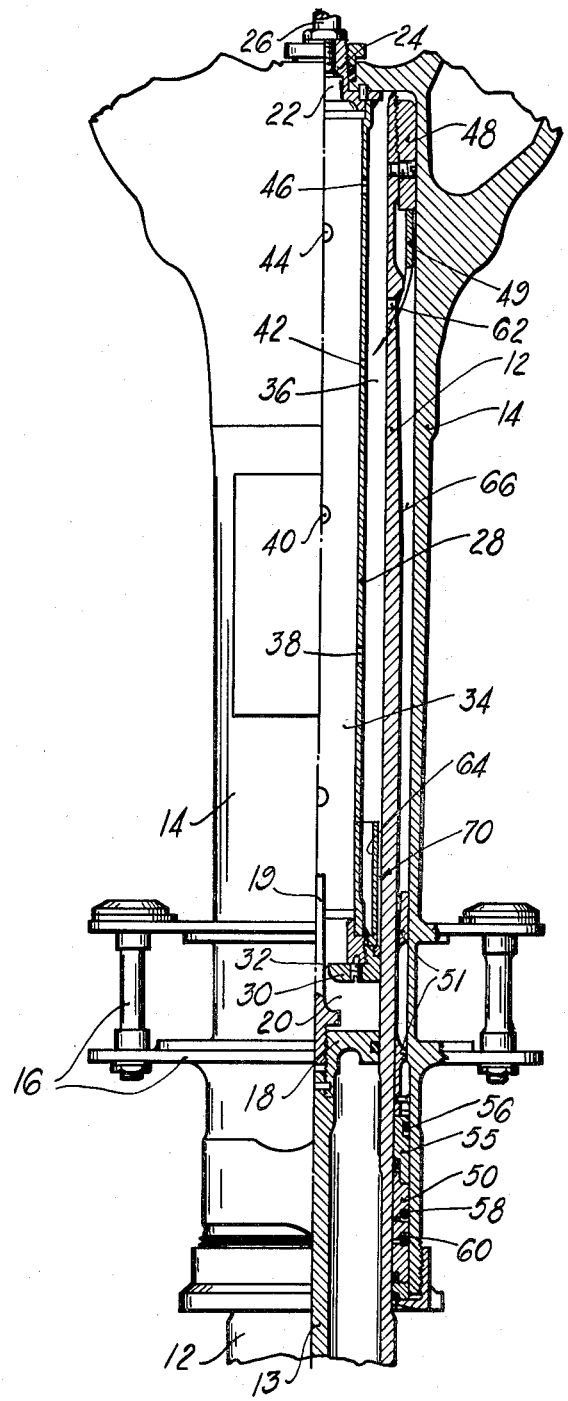
INVENTORS
THOMAS C. DELKER
ARNOLD W. NORDGREN
BY H.O. Clayton
ATTORNEY United States Patent Office 2,733,917
Patented Feb. 7, 1956

2,733,917

SHOCK STRUT

Thomas Clifford Delker and Arnold William Nordgren, South Bend, Ind., assignors to Bendix Aviation Corporation, South Bend, Ind., a corporation of Delaware Application February 4, 1952, Serial No. 269,774

4 Claims. (Cl. 267—64)

The present invention relates to aircraft landing gear, and particularly to the compressible shock absorbing portion thereof, hereinafter referred to as shock strut or strut.

More particularly the invention relates to the three tube air and oil type of shock strut used in the nose wheel assembly of an aircraft.

This type of nose wheel shock strut is subject to considerable wear due to the lack of proper cushioning of the parts secured to the wheel on the extension stroke of the mechanism; for immediately after the aircraft leaves the ground the weight of the wheel and parts of the strut secured thereto, together with the operation of the compressed air within the strut tends to rapidly move these parts to their extended position; and if said parts are not properly snubbed at the end of their stroke there results an undesirable noise as the parts come to an abrupt stop; furthermore the parts of the strut mechanism are subjected to undesirable wear, stress and strain.

Accordingly, it is an object of our invention to provide an improved three tube air and oil type of shock strut wherein the extension stroke of the moving parts is accomplished in two stages the second and last stage serving to effect the desired dissipation of kinetic energy to thereby obviate the aforementioned undesirable noise and wear of the parts.

A further object of our invention is to provide a strut which utilizes the barest minimum of additional parts and requires only a very slight modification of conventional structures to obtain the advantages discussed in the preceding paragraph.

Other objects and advantages of the present invention will appear during the subsequent description of an embodiment of the invention, which for the purposes of the present application has been illustrated in the accompanying drawing, in which:

The figure is a vertical sectional view showing a shock strut incorporating our invention, the strut being in the compressed position.

Referring to the drawing the shock strut in general comprises inner and outer telescoping cylindrical or tubular members 12 and 14, respectively, the member 12 having a member 13 secured thereto at its base, not shown.

As illustrated, the outer tubular member 14 constitutes the upper part of the strut and is adapted to be secured to the body of the airplane, whereas the inner tubular member 12 constitutes the lower portion of the strut and is adapted to support the ground contacting element of the plane, such as the wheel; and structures 16, connected to the member 14, is connected to the body of the airplane by means, not shown. To the member 13 there is secured a fixed wall or piston member 18, which carries thereon a tapered metering pin 19 for a purpose which will hereinafter be described. The closed chamber 20 formed inside the inner telescoping member 12 is arranged to be filled with a suitable liquid, which constitutes the energy dissipating medium during the landing shock of the aircraft. The liquid may be admitted to the interior of the strut through an inlet 22 formed in a fixed wall 24 located at the top of the outer cylinder 14. The inlet 22 is also used for the admission of air under pressure to the shock strut, and a closure member 26 is provided for said inlet. The compressed air remains in the upper portion of the strut, and during operation of the strut serves as a compressible medium for storing energy and for softening the bumps encountered during taxiing of the plane.

A tubular piston rod 28 is supported at the top of the outer cylindrical member 14, and has secured to its lower end a piston 30 which is provided with an orifice 32. When the aircraft lands, the orifice 32 and the metering pin 19 cooperate to restrict the flow of liquid from chamber 20 to chambers 34 and 36 formed above the piston 30. The contour of the metering pin 19 is such as to vary the size of the orifice 32 and thus control the resistance to flow of the liquid to thereby obtain the optimum conditions of energy dissipation during the landing stroke of the strut. In some instances a metering pin such as the pin 19 is not found necessary for the satisfactory operation of the strut, and accordingly the present invention is not necessarily limited to struts having metering pins, but is intended to be broadly applicable to all shock absorbing devices.

Free communication between chambers 34 and 36 is permitted by a plurality of openings, such as 38, 40 and 42. Also, in the upper part of the strut, free movement of compressed air between the upper extensions of said chambers 34 and 36 is permitted by such openings as 44 and 46.

Bearing contact between the inner and outer telescoping members 12 and 14 is provided at two places. A bearing member 48 is secured to the upper end of the inner telescoping member 12 and a bearing member 50 is secured to the lower end of the outer telescoping member 14. There is therefore a direct wall-to-wall contact between the inner and outer telescoping members through the medium of the upper and lower bearing members 48 and 50. The figure of the drawing illustrates the upper and lower bearings in the position in which they are farthest separated from one another. It will be appreciated however that the position of maximum bending moment is when the bearings 48 and 50 are closest to one another; and this is when the strut parts are in their fully extended position. In other words, a given force exerted on the lower end of the strut tending to bend the same will exert a maximum binding effect through the bearings when they are located this closely to one another. It will be apparent therefore that, even in the fully extended position of the strut, a certain distance will usually have to be allowed between the upper and lower bearings in order to minimize the binding effect of external bending forces. The amount of space required between the bearings will of course depend upon the structural details of the aircraft and strut.

Means will usually be provided to guarantee a certain spacing between the bearings when the strut is in fully extended position. In order to satisfy this requirement, although shoulders on the structural parts of the strut are sometimes provided, we prefer to use separate spacer elements in the drawing said spacer elements bearing the numbers 49, 51 and 55. The elements 49 and 51 also serve as centering cams to maintain a proper alignment of the nose wheel with respect to the aircraft as the strut approaches its fully extended position. Suitable seals 56, 58 and 60 are provided to prevent escape of fluid past the bearing 50.

Describing now the heart of our invention the strut mechanism is provided with means for effecting a two stage movement of the wheel connected member 12 immediately after the aircraft leaves the ground on its takeoff. To this end the member 12 is preferably provided at its upper end, with a plurality of openings 62 only one of which is shown in the drawing. These openings are preferably spaced an equal distance from the top of the member 12. The portion of the member 12 outlining the openings 62 constitutes in effect a valve member which cooperates with a hydraulic bumper valve member 64 secured to the piston 30. The valve member 64, preferably of bronze and fashioned as a sleeve member, may be supplanted by a piston member secured to the piston 30. As disclosed in the drawing the outer diameter of the sleeve valve member 64 is slightly less than the interior diameter of the member 12, all for a purpose to be described hereinafter.

Describing now the operation of the mechanism of our invention it will be assumed that the aircraft is in the air and preparing to land; and the shock strut will then be in its extended position. When the aircraft contacts the ground, the upward movement of member 12 with respect to member 14, will force liquid from chamber 20 through the orifice 32, increasing the pressure of the compressed air in the upper part of the strut. The movement of liquid through the restricted opening 32 converts the kinetic descent energy of the landing aircraft into heat due to the frictional resisance to flow of the liquid within the confines of the shock strut. That portion of the energy which is not converted in this manner is temporarily stored in the compressed air in the upper part of the strut. In this connection, it will be apparent that the resilient medium in the strut need not necessarily be air, but may be a mechanical spring, or the like. When the force produced by the air pressure plus frictional resistance of movable parts in the strut has been built up to the point where it equals the force tending to compress the strut, the compression stroke ceases. During the compression stroke, the liquid from the interior of the struts passes through ports 62 into a chamber 66, said chamber increasing in volume as the strut is compressed.

When the aircraft takes off the strut extends under the influence of the weight of the wheel; furthermore, the gravity force producing this extending operation of the strut is supplemented by expansile force of the compressed air within the strut. In this operation the movement of the member 12 to its fully extended position is effected in two stages, the first stage taking place as fluid is forced from the chamber 66 through the openings 62 and into the chamber 36. This first stage, wherein the velocity of the member 12 progressively increases, is terminated when member 12 moves downwardly enough so that the openings 62 are covered by the valve member 64. The second stage of movement of the member 12 is then initiated; the fluid flows at a relatively slow rate from the chamber 66 into the space between the valve 64 and member 12. This space is indicated by the reference numeral 70 in the figure of the drawing. The member 12 then finally comes to rest when the spacer member 49 contacts the spacer member 51. In this two stage operation of the mechanism the fluid flows through the valve structure provided by (1) the openings 62 and (2) the space provided by said openings and the cooperating valve member 64 spaced from said openings.

There is thus provided, by the provision of the valve member 64, the valve member at the upper end of the member 12, and the remainder of the parts of the strut mechanism of our invention, means for effecting both a controlled compression stroke of the mechanism and a controlled expansion stroke, the latter stroke being effected in two stages to both expedite the total time required for full strut extension and also to minimize the wear and tear of the parts and undesirable noisy operation which would result should the valve mechanism be omitted from the structure. The cushioning effect resulting from the operation of the valve 62, 64 appreciably reduces the impact of the member 12 at the end of its stroke.

Although a particular embodiment of our invention has been described, it will be understood by those skilled in the art that the object of the invention may be attained by the use of constructions different in certain respects from that disclosed without departing from the underlying principles of the invention. We therefore desire by the following claims to include within the scope of our invention all such variations and modifications by which substantially the results of our invention may be obtained through the use of substantially the same or equivalent means.

We claim:

1. For use in aircraft landing gear, a shock strut comprising two telescoping members, one of which is adapted to be connected to the aircraft body and the other of which is adapted to carry the ground contacting element, said other telescoping member having an orifice at one end thereof, a tubular member secured to one of the telescoping members and extending within said telescoping members, a liquid housed within the strut and confined within chambers outlined by the aforementioned three members, orifice-restricting means on said tubular member providing a restricted passage extending in the direction of strut movement and located between said orifice-restricting means and the movable telescoping member to restrict the flow of liquid through said orifice as said telescoping members approach maximum extension in a manner controlling the flow of liquid from the chamber outlined in large part by the inner wall of the outer telescoping member and the outer wall of the inner telescoping member.

2. For use in aircraft landing gear, a shock strut mechanism comprising two telescoping members, one of which is adapted to be connected to the aircraft body and the other of which is adapted to carry the ground contacting element, a tubular member secured to one of the telescoping members and extending within said telescoping members, a liquid housed within the strut and confined within chambers outlined by the aforementioned three members, compressed air housed within the strut in the upper end thereof above the liquid, valve means for controlling the flow of liquid from the chamber outlined in large part by the inner wall of the outer telescoping member and the outer wall of the inner telescoping member, said valve means including an orifice in the upper end of one of the telescoping members and further including a sleeve member connected to the lower end of the tubular member, there being limited clearance between said sleeve member and the latter telescoping member which carries the ground contacting element to restrict the flow of liquid through said orifice as said telescoping members approach maximum extension.

3. For use in aircraft landing gear, a shock strut mechanism comprising two telescoping members, one of which is adapted to be connected to the aircraft body and the other of which is adapted to carry the ground contacting element, a tubular member secured to one of the telescoping members and extending within said telescoping members, a liquid housed within the strut and confined within chambers outlined by the aforementioned three members, valve means for controlling the flow of liquid from the chamber outlined in large part by the inner wall of the outer telescoping member and the outer wall of the inner telescoping member, said valve means including an orifice in the upper end of one of the telescoping members and further including a sleeve member connected to the lower end of the tubular member, there being limited clearance between said sleeve member and the latter telescoping member which carries the ground contacting element to restrict the flow of liquid through said orifice as said telescoping members approach maximum extension.

4. For use in aircraft landing gear, a shock strut mechanism comprising two telescoping members, one of which is adapted to be connected to the aircraft body and the other of which is adapted to carry the ground contacting element, a tubular member secured to one of the telescoping members and extending within said telescoping members, a liquid housed within the strut and confined within chambers outlined by the aforementioned three members, valve means for controlling the flow of liquid from the chamber outlined in large part by the inner wall of the outer telescoping member and the outer wall of the inner telescoping member, said valve means including an orifice in the upper end of one of the telescoping members and further including an orifice-restricting means on said tubular member providing a restricted passage extending in the direction of strut movement and located between said orifice-restricting means and the associated telescoping member to restrict the flow of liquid through said orifice as said telescoping members approach maximum extension.

References Cited in the file of this patent

UNITED STATES PATENTS

| | | |
|---|---|---|
| 2,231,332 | Griepenstroh | Feb. 11, 1941 |
| 2,248,836 | Wallace | July 8, 1941 |
| 2,364,865 | Mattingly | Dec. 12, 1944 |
| 2,440,353 | Wallace | Apr. 27, 1948 |
| 2,539,842 | Katz | Jan. 30, 1951 |